Dec. 14, 1954  R. HOVIS  2,697,004
INSIDE VISOR
Filed May 1, 1951
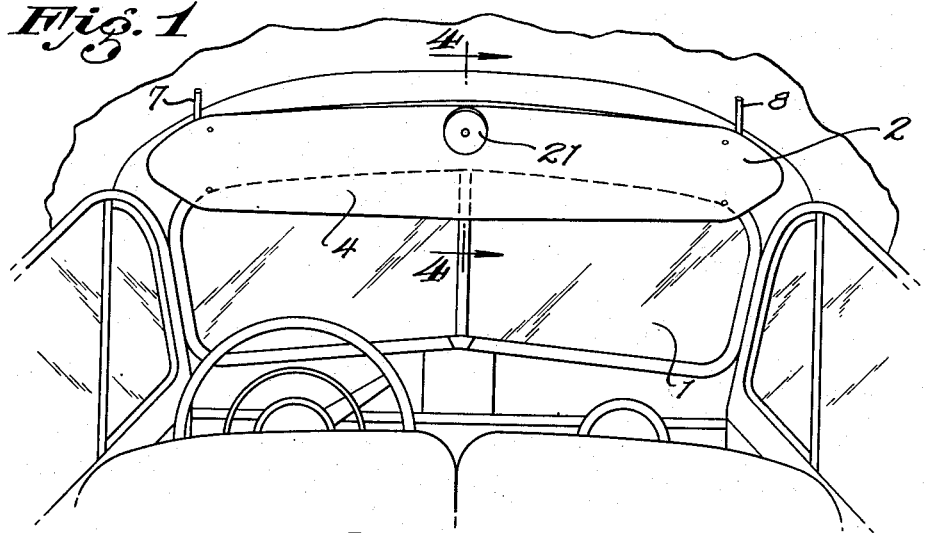
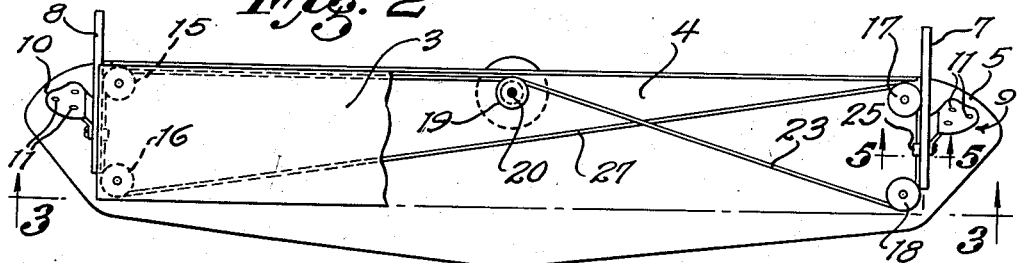
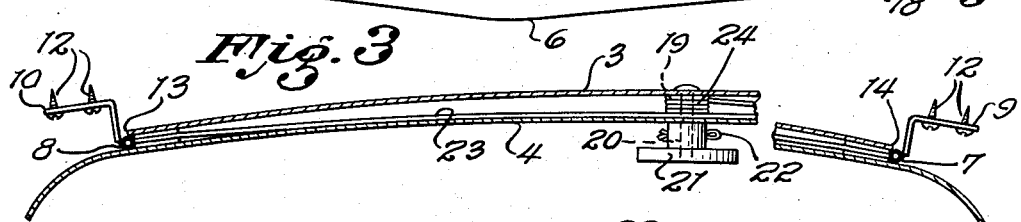
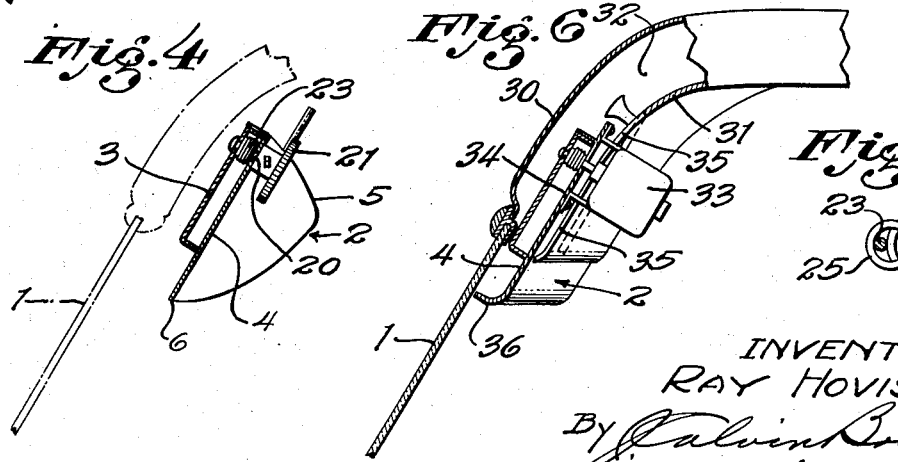
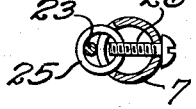
INVENTOR,
RAY HOVIS;
By Calvin Brown
ATTORNEY.

United States Patent Office

2,697,004
Patented Dec. 14, 1954

2,697,004

INSIDE VISOR

Ray Hovis, Slayton, Minn.

Application May 1, 1951, Serial No. 223,986

2 Claims. (Cl. 296—97)

The present invention relates to visors and more particularly to a sun visor for use on vehicles.

The visor of the invention may be utilized on any type of vehicle whether it be passenger or truck and contemplates a visor adapted to be placed inside the driver's compartment for ready actuation by the driver. The average sun visor is positioned externally of the vehicle above the windshield. As a rule such a visor does not add to the attractiveness of the vehicle and generally detracts from its appearance. In addition it has other bad features such as, obstructing the driver's vision of traffic signals, causes increased air resistance, thus lowering mileage otherwise obtainable per gallon of gas, is usually not adjustable as to position, and makes considerable noise such as whistling while the car is proceeding over the roadway.

An object of the present invention is to provide a visor of attractive appearance, which may be readily installed in the driver's compartment of a vehicle, which is readily adjustable by the driver, not subject to rattle, and does not affect the streamlining of the automobile.

The present visor of the invention is simple of structure, economical in cost of manufacture and generally superior to external visors.

With the above mentioned and other objects in view, the invention consists in the novel and useful provision, formation, construction, association and relative arrangement of parts, members and features, all as shown in certain embodiments in the accompanying drawing described generally and more particularly pointed out in the claims.

In the drawing:

Figure 1 is a fragmentary view showing the interior of a vehicle and looking toward the driver's compartment, one form of the invention being installed in said compartment and adjacent the windshield, Figure 2 is the opposite side view of the visor shown in Figure 1, partly in fragment to show structural features of the visor, Figure 3 is a detached sectional view on the line 3—3 of Figure 2, Figure 4 is a fragmentary sectional view on the line 4—4 of Figure 1, Figure 5 is a sectional view, on an enlarged scale, on the line 5—5 of Figure 2, and Figure 6 is a fragmentary sectional view of a modification of the invention.

Referring now with particularity to the drawing, I have illustrated in Figure 1, in fragment, the driver's compartment of a vehicle, in which 1 is the windshield and 2 one form of visor utilized in the practice of the present invention. The visor 2 of the invention may be made of any material desired, such as metal, fabric, fibre or glass, and said visor has front and rear panels 3 and 4 adapted to extend substantially the width of the windshield 1. Generally such a visor is of rectangular form, although the ends may contemplate a geometrical figure, as may likewise the bottom edge thereof as shown in Figure 2, at 5 and 6. The visor is adapted to be raised or lowered relative to the upper edge of the windshield 1. In the construction, I provide a pair of substantially parallel spaced apart guide tubes 7 and 8 for each end of the visor. Secured to each tube is a bracket as shown at 9 and 10. These brackets are of angular construction with one angle perforated as shown at 11, whereby the said bracket may be secured to the car body within the driver's compartment, as see Figure 3 at 12. The rear panel 3 of the visor terminates adjacent the said rods as shown at 13 and 14 and interposed between the front and rear panels 3 and 4 are upper and lower pairs of pulleys 15, 16, 17 and 18. Positioned centrally of the visor, adjacent the top edge thereof and interposed between panels 3 and 4 is a drum 19, mounted upon a shaft 20, the shaft being journaled in the panels 3 and 4 and extending outwardly of the member 4, there being a knob 21 secured to said shaft by means 22 whereby turning of the knob will rotate the drum. A flexible wire or cord 23 of continuous form is coiled upon the drum as shown at 24 and passed between and over the pulleys 15, 16, 17 and 18 as shown in Figure 2. The length of the cord between the upper and lower pulleys is in each instance secured by a clip of some form such as illustrated by way of example in Figure 5 at 25 and wherein the rod or tube 7 carries a screw 26 which secures the tubular clip 25. The construction is adhered to for the opposite guide tube or rod 8. The cord or flexible cable 23 extends between pulleys 15 and 16, then a length 27 extends between pulleys 16 and 17, from pulley 17 to pulley 18, then to drum 19 and back to pulley 15. When the knob 21 is rotated in either direction the visor will be moved upwardly or downwardly relative to the guide tubes 7 and 8 for the reason that portions of the cord or flexible cable are fastened by the clips 25 to said guide rods, the guide rods being interposed between the ends 13 and 14 of the rear visor panel 3 and the front panel 4, as shown in Figure 3. Thus during a raising and a lowering of the visor the same is stabilized in its movement and offers assurance that both ends of the visor will rise evenly and that there shall be no cant.

It is obvious that the edges of the panels forming the visor may be sealed to add to the attractiveness of the appearance thereof and that the ends 5 of the visor panel 4 may be curved as shown in Figure 3 to conform to the inner curvature of the car body forwardly of the driver's seat and above and to the sides of the windshield 1.

Preferably the visor is positioned close to the windshield 1, as illustrated in Figure 4.

A modification of the invention is shown in Figure 6, and wherein the same type of visor is used as shown in the other figures, save and except that the visor is raised or lowered from a pocket formed between the car top and the head lining. The car top is shown in Figure 6 at 30 and the head lining at 31. Thus there is provided a space 32 between said car portions. This space or pocket is utilized for receiving the visor 2, and in the instant construction I utilize an electric motor 33 which when energized will move the visor 2. In other words, instead of manual operation of the visor by turning the knob 21, the motor is utilized. This motor, as shown, is mounted by brackets 34 on the windshield panel 4 and the shaft of the said motor drives a drum similar to that shown at 19. The mounting brackets for the motor extend through an elongated slot 35 in the head lining so that the motor as an entirety will move upwardly or downwardly as the visor is raised or lowered relative to the windshield and the pocket 32. As stated, the construction otherwise remains the same, with the possible exception that the lower edge of the visor panel 4 may be curved toward the windshield 1 as shown at 36. A suitable switch, connected with a source of electricity, may be utilized for completing a circuit to the motor 33 to actuate the same, the motor, of course, being of the reversible type and the switch being of the three-way type.

In place of the electric motor I may employ an hydraulic fluid for moving a piston within a cylinder or a vacuum cylinder may be employed to raise or lower the visor. The vacuum system would operate in a manner substantially the same as for the hydraulic system and in the well understood manner, no invention being claimed for any particular system other than that means must be provided for raising and lowering the visor relative to the windshield.

The operation, uses and advantages of the invention just described are as follows:

It is quite evident that when driving over roads various conditions are met, such as early morning and evening sunlight. Early morning or late afternoon sunlight may require a lowering of the visor relative to the windshield to prevent glare in the driver's eyes whereas at high noon there is no direct light glare in the eyes of the driver and as a consequence the visor may be raised relative to the windshield. Furthermore, in driving in the mountains it is often times desired to view the scenery and as a consequence the visor may be raised to its utmost limit. Practically any light condition encountered may be compensated to prevent glare in the driver's eyes or a passenger's eyes by controlling the raising and lowering of the visor within the driver's compartment. By moving the visor between the car top and the head lining the visor is caused to completely disappear, if desired, which would add to the attractive appearance of the car. Other adaptations of the invention provide for its use adjacent any of the windows of a vehicle, to be raised or lowered automatically from the driver's compartment or at an adjacent window. Thus the rear window of a vehicle may be installed with a visor so that glare from headlights approaching the vehicle from the rear thereof may be shut off or minimized. The same is true for the side windows in the case of excessive sunshine.

I claim:

1. A visor for vehicles, including a front panel and a rear panel, pairs of upper and lower pulleys mounted for rotation between the said panels, a drum between said panels, a continuous cord having one length passed around said drum and between the pairs of pulleys, a pair of guide tubes contiguous to the pairs of upper and lower pulleys, a mounting bracket for each guide tube, means for securing stretches of said continuous cord to each guide tube, and whereby rotation of the drum will raise and lower the panels relative to the guide tubes.

2. A visor for mounting within a vehicle adjacent the windshield thereof, including front and rear panels, the front panel of which has a length equal to the width of the vehicle windshield and the rear panel of which has a shorter dimensional length than the front panel, upper and lower pairs of pulleys interposed between the front and rear panels, the said upper and lower pairs being positioned adjacent the ends of the rear panel, a drum centrally mounted between said panels, a contiguous cord having one of its stretches wound about the drum and passed between the upper and lower pairs of pulleys to provide two stretches of said cord which are substantially parallel, a pair of tubes provided with brackets for mounting the said tubes to the vehicle, said tubes extending between the upper and lower pairs of pulleys, means securing each guide tube to a parallel stretch of said cord, and whereby rotation of the drum moves said continuous cord to raise or lower the visor relative to the guide tubes.

References Cited in the file of this patent

UNITED STATES PATENTS

| Number | Name | Date |
|---|---|---|
| 1,931,438 | Hitz | Oct. 17, 1933 |

FOREIGN PATENTS

| Number | Country | Date |
|---|---|---|
| 581,285 | Germany | July 25, 1933 |
| 644,031 | France | Oct. 1, 1928 |